United States Patent [19]

Fennel, Jr. et al.

[11] 4,295,217
[45] Oct. 13, 1981

[54] APPARATUS TO REDUCE THE EFFECT OF A MID-TALKSPURT FREEZE-OUT

[75] Inventors: John W. Fennel, Jr., Olney; Robert J. Hallett, Adelphi, both of Md.; Stanley M. Head; Constantine M. Melas, both of Los Gatos, Calif.

[73] Assignee: IBM Corporation, Armonk, N.Y.

[21] Appl. No.: 108,076

[22] Filed: Dec. 28, 1979

[51] Int. Cl.³ .............................................. H04J 3/16
[52] U.S. Cl. ..................................... 370/81; 370/79; 370/104
[58] Field of Search ...................... 370/81, 79, 80, 82, 370/83, 84, 93, 104

[56] References Cited

U.S. PATENT DOCUMENTS 3,927,268 12/1975 Sciulli et al. ...................... 325/38 B
3,975,686 8/1976 Appel .................................. 179/2 R
4,005,276 1/1977 Abramson et al. ............... 179/170.2

FOREIGN PATENT DOCUMENTS 2743964 4/1979 Fed. Rep. of Germany ........ 370/81

Primary Examiner—Douglas W. Olms
Attorney, Agent, or Firm—M. H. Klitzman

[57] ABSTRACT

In reconstructing the analog waveform from a syllabically companded delta modulated digital signal transmitted over a TDMA communication channel operating at near its maximum channel capacity, the noise created in a mid-talkspurt freeze-out is greatly reduced by interpolating the amplitude of the waveform during the freeze-out at the receiver as that of the waveform in the previous period. This makes the quality of voice transmissions in the face of freeze-outs substantially better than prior art techniques which induce background noise during freeze-outs, without the necessity of transmitting a voice activity compression (VAC) mask to control the operation of the interpolation apparatus in the receiver. The interpolation occurs for the first 15 msec sampling period following either a freeze-out or a true VAC operation. The interpolation operation is supplied only once so that if two or more consecutive sampling periods occur at the receiver where no channels are received for a particular voice port, the background noise is injected into the voice port. This prevents the uncontrolled repetition of the interpolation at the end of a talkspurt.

4 Claims, 11 Drawing Figures

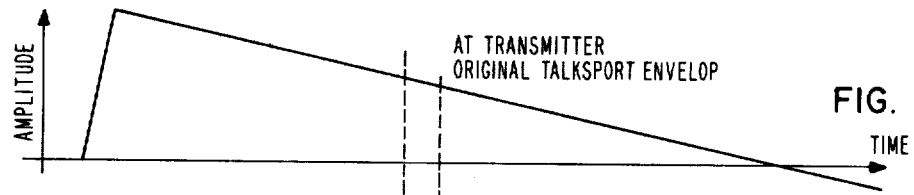
FIG. 8
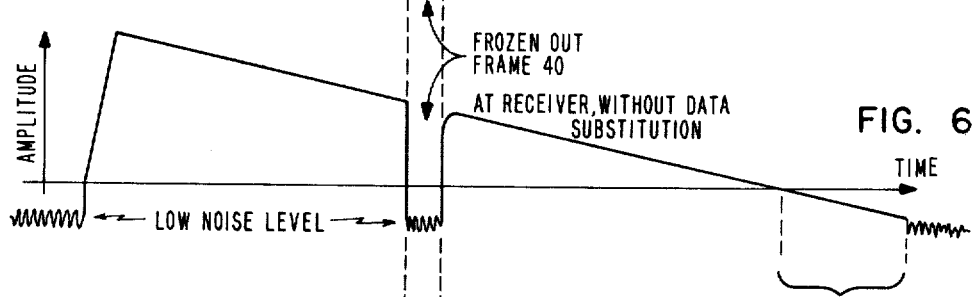
FIG. 9
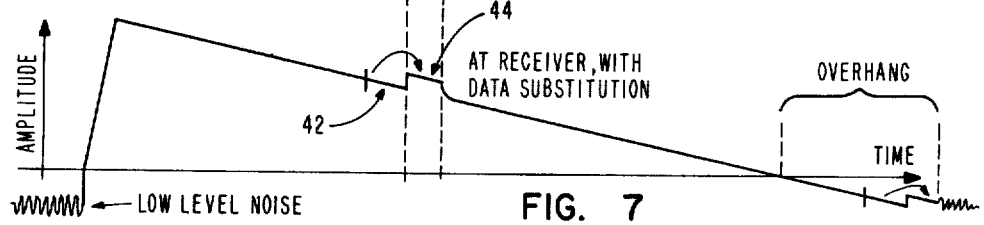
FIG. 5
FIG. 6
FIG. 7

APPARATUS TO REDUCE THE EFFECT OF A MID-TALKSPURT FREEZE-OUT

FIELD OF THE INVENTION

The invention disclosed broadly relates to communications apparatus and more particularly relates to apparatus for transmitting analog signals in digital form.

BACKGROUND OF THE INVENTION

Time Assignment Speech Interpolation (TASI) ("Overall Characteristics of a TASI System," J. M. Frazier, D. B. Bullock, and N. G. Long, BST J, July 1962, and "TASI Quality-Effect of Speech Detectors and Interpolation," H. Miedema and M. G. Schactman, BST J, July 1962) was the first telephone system to exploit the idle time in a telephone call. The basic idea was for a number of calls to share a lesser number of channels. High speed switching connects a speaker to a channel when a talkspurt is detected. When the talkspurt ends that channel is available for use by another active speaker. This system can approximately double the call capacity of telephone channels.

When the number of simultaneous speakers exceeds the number of channels some speech is lost. This loss of speech is called freeze-out. The amount of speech lost must be kept small so as to not appreciably affect quality. Speech loss on TASI generally averages less than 0.5 percent.

TASI was designed to give connection priority to already connected talkspurts. When a call became active it was connected to an available channel. If none were available, the new talkspurt was frozen out until a channel became available.

Digital implementation of TASI ("Digital Speech Interpolation," S. J. Campanella, *Comsat Technical Review*, Spring 1976) showed improvements over the original analog system. Incoming calls were digitized into 7 bit-per-sample pulse code modulation (PCM) at 8K samples per second. The freeze-out criterion was different from the original TASI. Instead of using percent of speech frozen out, the criterion was to hold freeze-outs longer than 50 msec to less than 2 percent. This was considered preferable to a fixed percent frozen-out since it related more closely to the cause of degradation, initial talkspurt freezeout.

In a further improvement, speech is digitized at 32K bits-per-second by syllabic companded delta modulation (SCDM). FIG. 1 schematically shows an SCDM circuit 10, an example of which is described in copending U.S. Pat. No. 4,208,740, Ser. No. 971,587, filed Dec. 20, 1978 by R. J. Hallett, et al., assigned to the instant assignee.

A comparison is made by comparator 2, at the clock rate, between the analog input and the analog estimate. The digital output represents the comparison results. If the estimate is less than the input, a positive increment equal to the step size is presented by flip-flop 4 to the integrator 6. An estimate larger than the input results in a negative increment. With companding by the compander 8, the step size is a function of comparison history. For example, if contiguous samples show the estimate too small, the step size increases. Alternating comparison results indicate good tracking, resulting in a constant step size. Good signal-to-noise performance can be achieved over much wider input signal range with companding ("Delta Modulation," H. R. Schindler, *IEEE Spectrum*, October 1970).

In an example time division multiple access (TDMA) satellite communication system, the system frame time is 15 msec. That is, packets of speech representing 15 msec, digitized into 480 bits, are transmitted to the receiver every 15 msec. FIG. 2 shows the transmission system. For example, from 100 calls shown in progress, the digital multiplexer 12 selects and attempts to fill the fifty 480 bit slots in the high speed transmission channel 14. A freeze-out occurs in call 99 because it happened to be the 51st packet selected and all available channels (50) have been used, as shown in the TDMA frame of FIG. 3. The demultiplexer 16, receiving no transmission for call 99, inserts idle noise from source 18 for that 15 msec interval.

The presence of speech at the transmit end is determined by a speech detector for example, with a fixed threshold of about −33 dBmO. Only frames with speech or overhang are candidates to be transmitted. Overhang refers to a number of frames which are to be transmitted following any frame with activity. The presence of overhang tends to reduce choppiness introduced by threshold levels.

The two TASI systems mentioned have a similar characteristic. That is, if a talkspurt suffers initial freeze-out, the next transmission received gives the actual value of the waveform. SCDM is somewhat different however. Freeze-out causes the receiver to lose step size information. When transmission resumes, the receiver might not return to the correct signal level during that talkspurt. This characteristic of SCDM creates a different level of acceptable freeze-out criteria than those for TASI systems.

Freeze-out of 15 msec duration in the body of talkspurts (approximately 100 msec from the start) are almost always noticeable. The audible effect is like a bubble in the word and word meaning is sometimes blurred.

OBJECTS OF THE INVENTION

It is therefore an object of the invention to provide an improved means for transmitting analog signals in digital form.

It is another object of the invention to provide a means for improving the quality of digitized voice signals.

It is yet a further object of the invention to provide an improved means for reducing the effects of freezeouts.

SUMMARY OF THE INVENTION

These and other objects, features and advantages of the invention are accomplished by the apparatus disclosed herein. In reconstructing the analog waveform from a syllabically companded delta modulated digital signal transmitted over a TDMA communication channel operating at near its maximum channel capacity, the noise created in a mid-talkspurt freeze-out is greatly reduced by interpolating the amplitude of the waveform during the freeze-out at the receiver as that of the waveform in the previous period. This makes the quality of voice transmissions in the face of freeze-outs substantially better than prior art techniques which induce background noise during freeze-outs, without the necessity of transmitting a voice activity compression (VAC) mask to control the operation of the interpolation apparatus in the receiver. The interpolation occurs for the first 15 msec sampling period following either a freezeout or a true VAC operation. The interpolation operation is supplied only once so that if two or more consecutive sampling periods occur at the receiver where no channels are received for a particular voice port, the background noise is injected into the voice port. This prevents the uncontrollable repetition of the interpolation at the end of a talkspurt. A freeze-out of a given channel for consecutive transmission frames is avoided by rotating the positions of all the channels in the frame between consecutive frames.

DESCRIPTION OF THE FIGURES

These and other objects, features and advantages of the invention will be more fully appreciated with reference to the accompanying figures.

FIG. 5 illustrates waveform of a voice signal at the transmitter, showing the original talkspurt envelope.

FIG. 6 illustrates the waveform of FIG. 5 after a frame (40) has been frozen-out, showing the contour at the receiver without data substitution.

FIG. 7 illustrates the waveform of FIG. 6 at the receiver after waveform substitution has been made from interval 42 into the frozen-out frame 44, in accordance with the invention.

FIG. 8 illustrates the normal operation of the invention.

FIG. 9 illustrates the operation of the invention when freeze-out occurs.

DISCUSSION OF THE PREFERRED EMBODIMENT

Figure 1:
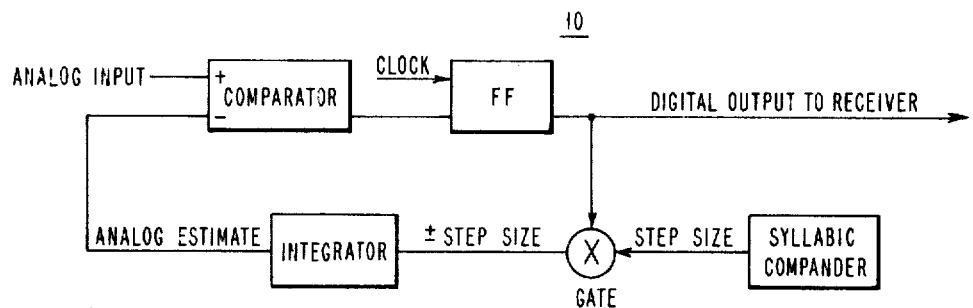
FIG. 1 is a symbolic diagram of a syllabic companded delta modulator.
Figure 2:
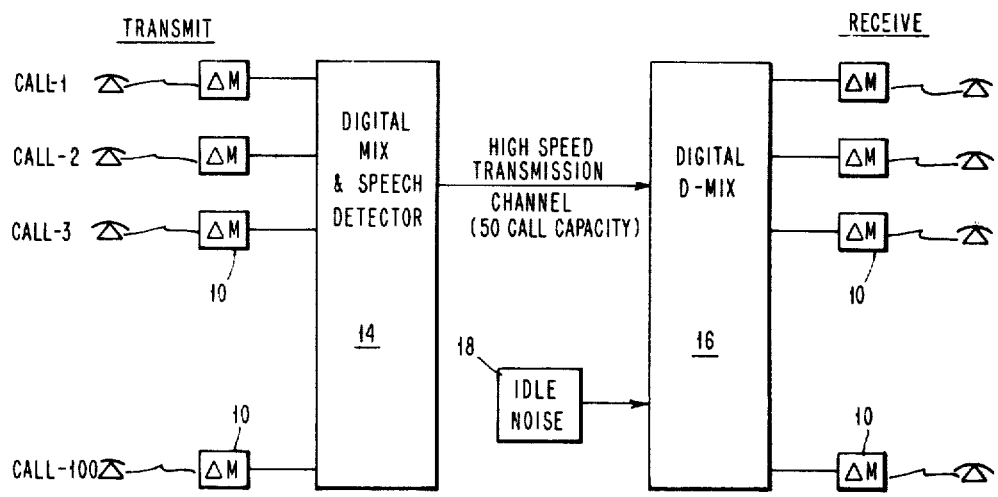
FIG. 2 is a schematic diagram of a time division multiple access (TDMA) voice transmission system.

The time division multiple access (TMDA) communication system of FIG. 2 has at least one transmission station where voice signals are digitized by means of the syllabic companded delta modulator 10 shown in FIG. 1. A digitized signal is transmitted over the communication link 14 which may be a synchronous satellite transponder to a receiver 20 at the receiving station shown in FIG. 4. The receiver 20 is connected through the digital switch 22 to the memories 24.1-24.M and 32.1-32.M and the switches 38.1-38.M to the voice ports 26.1-26.M.

Figure 4:
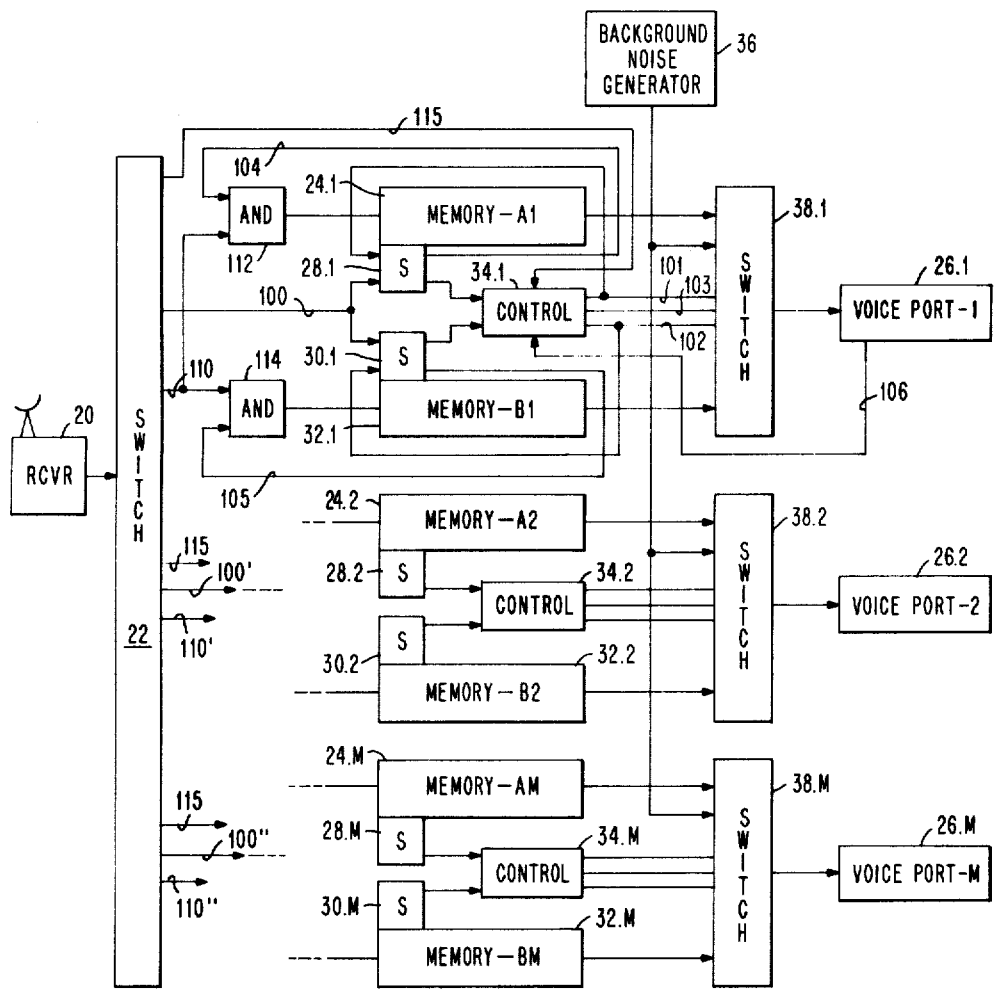
FIG. 4 is a functional block diagram illustrating one aspect of the invention.

The apparatus shown in FIG. 4 can be identified as a satellite communications controller which serves the function of interconnecting telephone facilities connected to the voice ports 26.1-26.M to a time division multiple access satellite transponder, via a burst modem and radio frequency terminal space link.

The digital switch 22, an example of which is described in detail in U.S. Pat. No. 4,009,343 to Markey, et al., assigned to the instant assignee, operates under the control of a local stored program digital computer to control a connection matrix within the digital switch 22 which establishes the correspondence between a particular voice port 26.1-26.M and the address of the connected port at a destination station geographically remote from the receiving station shown in FIG. 4. The digital switch 22 appends a port address to the transmitted information and directs received information to the addressed local port. By appropriately controlling the connection matrix within the digital switch 22, point-to-point communication can be established to any other communicating station in the satellite network.

Figure 3:
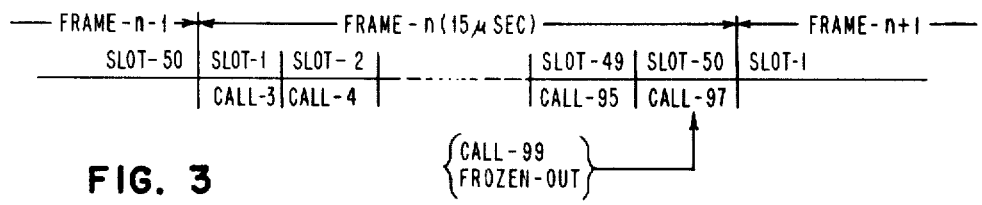
FIG. 3 illustrates an example format of a TDMA frame.

The digital switch 22 connects the slots or channels in the TDMA frame shown in FIG. 3 to the indicated one of the memories 24.1-24.M. Since there are a finite number of time division multiplexed slots or channels per TDMA frame shown in FIG. 3, there is some probability that certain ones of the digitized voice messages in the slots will be frozen-out.

As an illustrative example, the first voice port 26.1 and its associated first memory 24.1 and second memory 32.1 and the associated switch 38.1 will be analyzed. The first memory 24.1 is connected through the digital switch 22 to the receiver 20 for storing the slot or channel of digitized voice information in the last received TDMA frame. A status bit storage 28.1 associated with the first memory 24.1, indicates whether the last access to the first memory 24.1 was a write-in to the memory or a read-out of the memory operation.

A second memory 32.1 is connected through the digital switch 22 to receiver 20 and stores the presently received slot or channel in the TDMA frame, intended for the voice port 26.1. A status bit storage 30.1 associated with the second memory 32.1, indicates whether the last accessed second memory was a write-in to the memory or a read-out of the memory operation.

Both the first memory 24.1 and the second memory 32.1 are switchably connected by means of the switch 38.1 to the voice port 26.1, under the control of the control 34.1.

A background noise generator 36 has an output which is switchably connected through the switch 38.1 to the voice port 26.1.

The control 34.1 has an input connected to the status bit storage 28.1 associated with the memory 24.1 and the status bit storage 30.1 associated with the second memory 32.1. The control 34.1 has a control output connected to the switch 38.1. Control 34.1 will switchably connect the contents of the memory 24.1 through the switch 38.1 to the voice port 26.1 in response to the status bit storage 30.1 for the second memory 32.1 indicating that the slot or channel which was expected to be received in the present frame has not been stored in the second memory 32.1. This circumstance can be better understood with reference to FIGS. 5, 6 and 7, as described below.

FIGS. 8 and 9 illustrate the operation. FIG. 8 shows the normal operation. In T=1 (the first time slot) the first block of data for voice port 26.1 is received by memory 24.1. During T=2, that data is passed to voice port 26.1 and the second block of data is received by memory 32.1. During T=3, the second block of data is passed to the voice port 26.1, etc. FIG. 9 shows the operation when a freeze-out occurs. During slot T=3, no data is received. At the end of time slot T=3, the status bit storage 28.1 is set, indicating that no data was received in memory 24.1. During T=4, the status of bit storage 28.1 causes the already used data in memory 32.1 to be again passed to voice port 26.1. The block of data-4 is now received by memory 24.1.

At the transmitting station, the original talkspurt envelope is represented by FIG. 5 wherein the contour is continuous. In FIG. 6, because the TDMA frame was operating at maximum capacity, the slot in frame 40 which was destined for the voice port 26.1 was frozen-out so that the resultant waveform would appear at the receiver as is shown in FIG. 6. By operation of the control 34.1 in response to the status bit storage 28.1 indicating that a digitized voice signal from the slot in the presently received frame was not stored in the first memory 24.1, the data substitution shown in FIG. 7 occurs. The contents of the second memory 32.1 which stores the digitized voice signal for the slot in the last received frame 42 is substituted at 44 for the frozen-out information. This operation serves to smooth the contour of the resultant analog reconstruction of the digitized waveform, as shown in FIG. 7.

The control 34.1 has a second control output to the switch 38.1 for switchably connecting the output of the background noise generator 36 through the switch 38.1 to the voice port 26.1 in response to the status bit storage 28.1 for the first memory 24.1 and the status bit 30.1 for the second memory 32.1 indicating that no digitized signals have been stored in either the second memory 32.1 or the first memory 24.1 for the last frame and the present frame. The apparatus infers from this circumstance that the end of the talkspurt has occurred when two consecutive frames omit slots containing digitized voice signals directed to the first voice port 26.1. In this circumstance, the background noise signal is sent to the voice port 26.1.

Each of the M voice ports 26.1 through 26.M is connected through its corresponding switch 38.1-38.M and its first and second memories 24.1-24.M and 32.1-32.M to the digital switch 22 in the same manner as was described for that corresponding to the voice port 26.1. The background noise generator 36 is connected to each of the switches 38.1-38.M.

The resulting apparatus provides a high quality voice transmission in the face of freeze-out conditions without the necessity of transmitting voice activity compression (VAC) mask control bits.

DETAILED DESCRIPTION OF THE PREFERRED EMBODIMENT

FIG. 8 illustrates a normal operation with no freeze-out, and it is seen that memory A1 receives data at time 1 and at time 2 that data is passed to the voice port 26.1. Also at time 2 the system is receiving more data called data 2 and at time 3 data 2 is passed from memory B1 to the voice port 26.1 and data 3 is received. The system is receiving data with one memory A and passing the data to the voice port of the other memory B. With a freeze-out situation, it is assumed that time slots 1 and 2 are the same in FIG. 9, as in FIG. 8 and that memory A1 receives no data at time slot 3, as shown in FIG. 9. At time 3 data was stored in memory B1 for the voice port thus that data was passed to the voice port. At time 4, normally data would have passed in memory A1 to the voice port. However, there is no data in memory A1 so it is one aspect of the invention to pass the data in memory B1 again to the voice port. If there were a freeze-out of only one frame duration, then at time 4 the system actually receives data 4, which goes into memory A1. At time 5 the information is passed from memory A1 to the voice port. Thus, the voice port receives data units 1, 2, 2, 4 versus a normal situation in which it would receive 1, 2, 3, 4.

TABLE A

| Current Values | | Previous Values | | Select To Voice | Memory To Load From |
|---|---|---|---|---|---|
| $S_A$ | $S_B$ | $S_A$-old | $S_B$-old | Port | Switch |
| 1 | 0 | X | X | $A_1$-M | $B_1$-M |
| 0 | 1 | X | X | $B_1$-M | $A_1$-M |
| 0 | 0 | 1 | 0 | $A_1$-M | $B_1$-M |
| 0 | 0 | 0 | 1 | $B_1$-M | $A_1$-M |
| 0 | 0 | 0 | 0 | NOISE | $A_1$-M (arbitrary choice) |
| X | X | 1 | 1 | NOT ALLOWED | |
| 1 | 1 | X | X | | |

Figure 10:
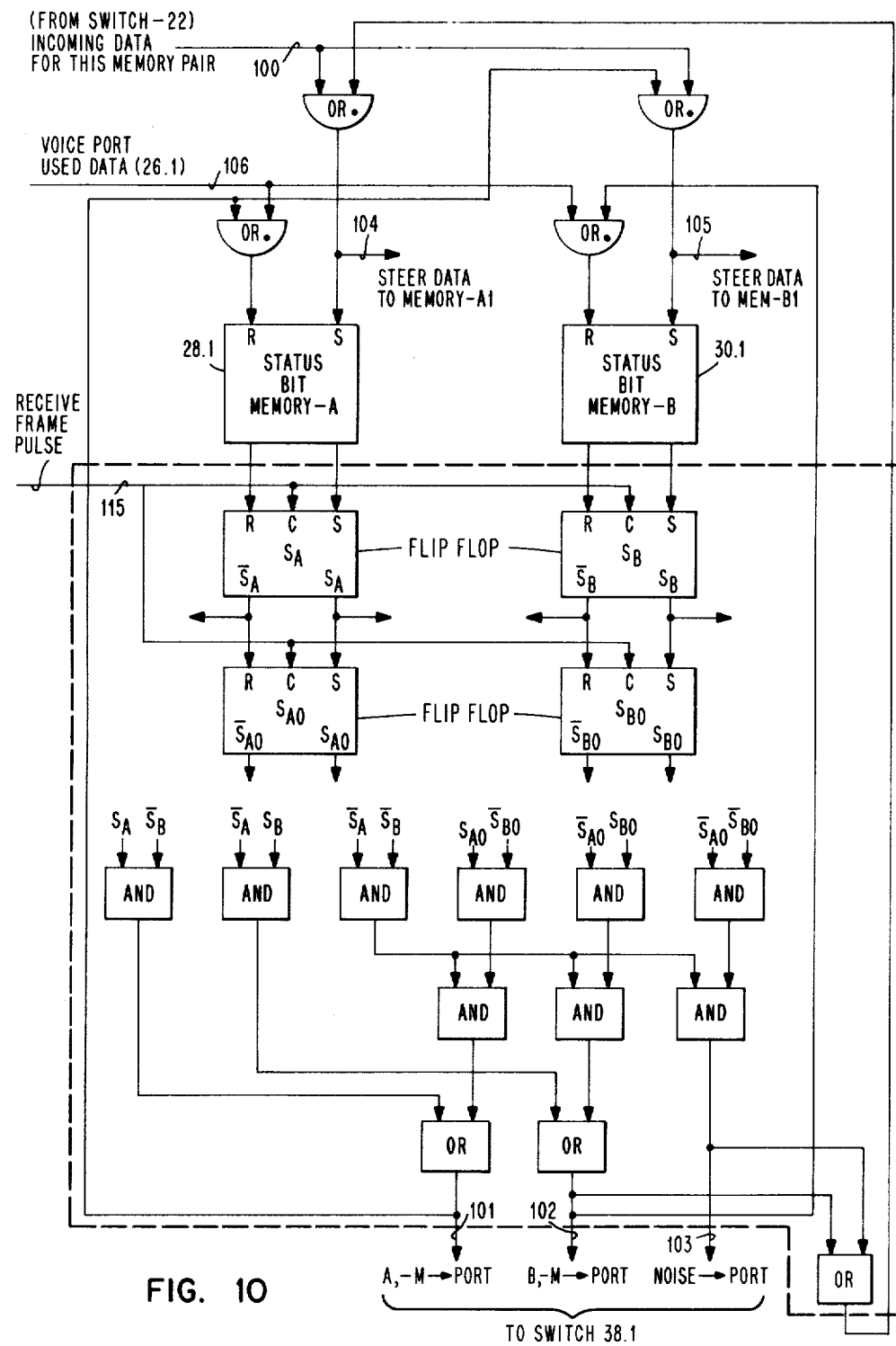
FIG. 10 is a detailed logic diagram of the control 34.

The implementation of Table A is shown in the detailed logic diagram of FIG. 10. Truth Table A is a binary representation of the information shown in FIG. 8 and 9. There are four data bits, or four memory bits associated with each voice port 26.1-26.M. That is, for the first voice port 26.1, status bit A refers to the status of memory A1. Status bit B refers to the status of memory B1. Status bit $S_A$-old is the previous value of status bit A, that is, the value in the previous frame. Status bit $S_B$-old is the previous value of status bit B. The first entry in truth Table A is to start $S_A$ as a binary value 1 and $S_B$ as a binary value 0. Both status $S_A$-old and $S_B$-old are arbitrary values X. Thus, memory A1 has data in it and memory B1 has no data in it, as indicated by $S_A$ and $S_B$. It does not matter what values $S_A$-old and $S_B$-old are. In this case the system then sends to the voice port the data in memory A1. If data is next received from the receiver 20, that data is put into the memory B1, in accordance with the first entry, in truth Table A. In the next case in Table A, if memory A1 is empty, then $S_A = 0$, and if memory B has good data in it, then $S_B = 1$. Again it does not matter what $S_A$-old and $S_B$-old values are. The system then sends to the voice port the data in memory B1 and if data is next received from the receiver, it goes into memory A1. The first situation is where neither memory A1 nor memory B1 have data, but the previous value of $S_A$-old is 1, and that of $S_B$-old is 0. In this case the system sends to the voice port the contents of memory A1, that is, the system is reusing or sending again the data in memory A1 and if data is next received from the receiver, it goes into memory B1. The next entry in truth Table A is the situation where neither $S_A$ nor $S_B$ has any valid data, but there is old data in memory B1 so the system selects the data in memory B1 to send to the voice port. The fifth case in truth Table A is where $S_A$, $S_B$, $S_A$-old and $S_B$-old are all 0. That means that in two consecutive frames the system has received no new data from the receiver. In this case the system does not consider the omission of data a freeze-out because there were two in a row, and thus the system sends background noise to the voice port. This condition is interpreted as the end of a talk spurt. The last two cases in the truth Table A represent situations that will not happen.

Equations 1, 2a, 2b, 3a and 3b are Boolean expressions of the operation described in Table A.

$$\text{Select NOISE} = \bar{S}_A \bar{S}_B \bar{S}_{AO} \bar{S}_{BO} \quad (1)$$

$$\text{Select } A_1 = S_A \bar{S}_B + \bar{S}_A \bar{S}_B S_{AO} \bar{S}_{BO} \quad (2a)$$

$$\text{Select } B_1 = \bar{S}_A S_B + \bar{S}_A \bar{S}_B \bar{S}_{AO} S_{BO} \quad (2b)$$

$$\text{Load } A_1 = \text{NOISE} + \overline{\text{SELECT } A_1} \quad (3a)$$

$$\text{Load } B_1 = \overline{\text{LOAD } A_1} \tag{3b}$$

Equation 1 states when the noise source is the source of data for the voice port. In the column labeled "select to voice port" in truth Table A the fifth line shows that the system selects noise when $S_A$, $S_B$, $S_A$-old, $S_B$-old are all 0. That is what equation 1 requires.

The system selects the data from memory A1 to go to the voice port according to two entries in truth Table A, the first line and the third line. For example, Equation 2a says the data in memory A1 goes to the voice port when $S_A = 1$, and $S_B = 0$, which is line 1 of the truth Table A. Similarly, Equation 2b determines when memory B1 transfers data to the port. Equations 3a and 3b determine into which memory the data from the receiver is loaded. Equation 3a says load memory A1 if the system has selected noise to go to the voice port, which is line 5 of the truth Table A (memory A1 is an arbitrary choice). Also, the system selects memory A1 to load the data from the receiver if data from memory A1 is not selected to go to the voice port. Similarly, Equation 3b determines when memory B1 is loaded. This explains the three equations which express the operation described in truth Table A. The logic represented by FIG. 10 is simply the implementation of truth Table A and Equations 1, 2 and 3.

Figure 11:
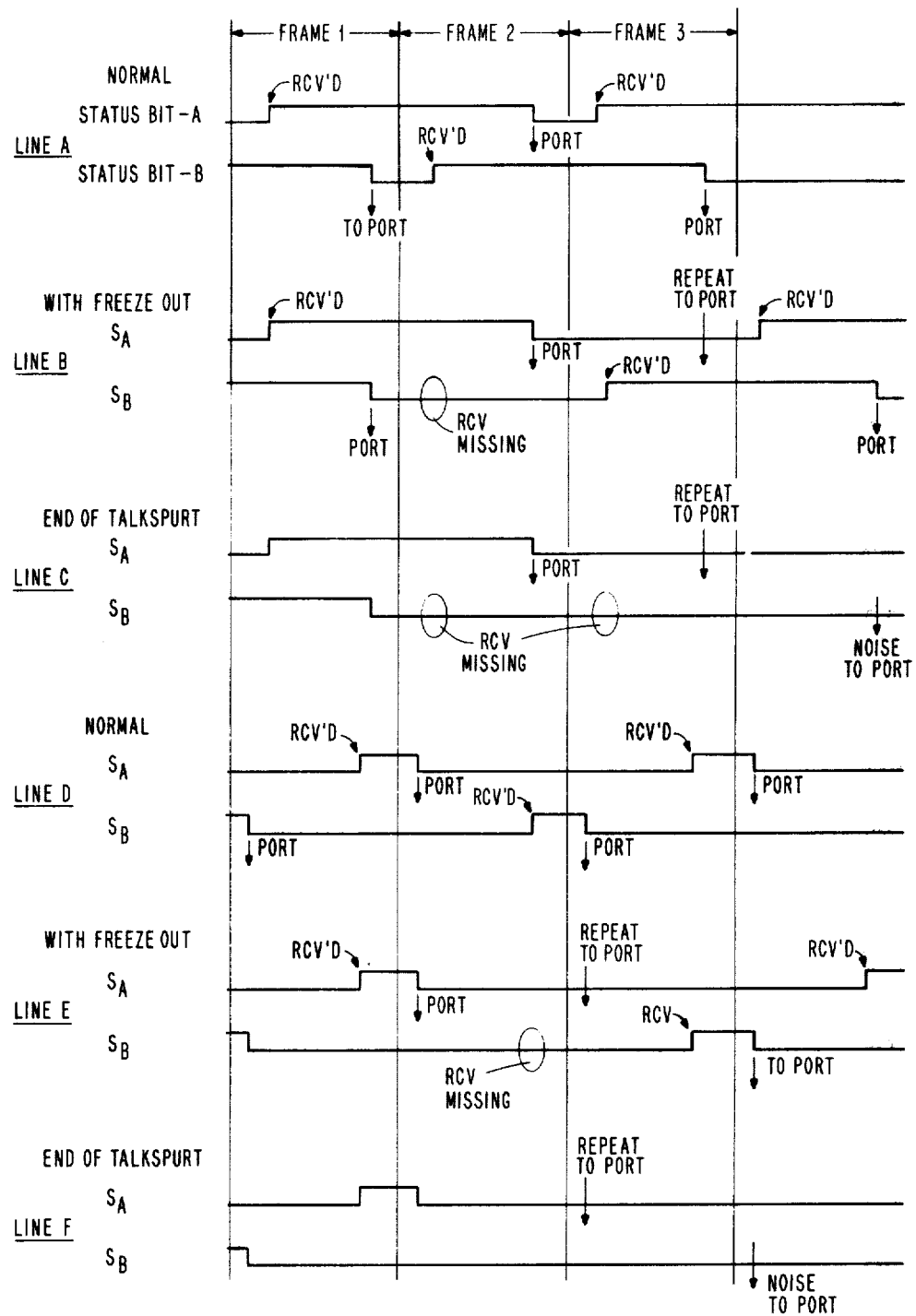
FIG. 11 is a timing diagram for the operation of the invention.

The timing diagram of FIG. 11 is divided into two-halves which represent the different timings for the data when it is received from the receiver and when the data is sent to the port. Lines A, B and C depict the data being received from the receiver in the early part of the frame and sent to the port in the latter part of the frame. Lines D, E and F depict the data being sent to the port in early part of the frame and received from the receiver in the latter part of the frame.

The timing diagrams of FIG. 11 show the operation of status bits A and B. Vertical lines crossing all of these time lines are frame indications, with the frames indicated as 1, 2 and 3, across the top. Normal operation is shown by line A of FIG. 11.

During frame number 1 the first event that occurs is the system having received data for the port from the receiver. Status bit A was low or a 0 prior to the start of frame 1. The received data does into memory A1 so that status bit A goes to a high or a 1 level. The assumption is made that status bit B is a 1 at the time frame 1 began, which means data was received for memory B1 in frame 0 and in the latter part of frame 1, memory B1 has to send data to the port. The data is sent to the port and status bit B goes low to a 0 level. When frame 2 begins, status bit A is a 1 and status bit B is a 0. In truth Table A this corresponds to the line number 1 and which shows status bit A is a 1 and status bit B is a 0 at the beginning of frame 2. According to line 1 of the truth Table A, during frame number 2 the data in memory A1 is sent to the voice port and data from the receiver is loaded into memory B1. In frame 2 in FIG. 11, the first thing that occurs is loading of data from the receiver into memory B1, causing the status bit B to go to a 1. Later data is sent to the port from memory location A1 and status bit A goes to a 0 level. When frame 3 begins, status bit A is a 0, and status bit B is a 1. That corresponds to line number 2 in truth Table A where, in this situation the system will send to the voice port the data in memory B1 and load the data from the receiver into memory A1. Next in frame 3 the system receives data from the receiver and loads it into memory A1 and the status bit A goes to a 1 level. Later data is sent to the port from memory location B1, causing status bit B to go to a 0. It can be seen that the time the system determines its next step for the operation is at the frame time, the vertical line in FIG. 11. At each frame time the system examines the status of the status bits A and B and the previous values of status bits A and B and makes the determination according to the truth Table A.

Line B of FIG. 11 is similar to line A except that it shows the systems operation when a freeze-out occurs in frame 2. In line B, the circle indicates that a data reception is missing. The system normally expects to receive data for this port as it did in line A of FIG. 11, but when a freeze-out occurs, it does not receive any data for this port. At the beginning of frame 3 the condition of the status bits is $S_A = 0$ and $S_B = 0$. The status of $S_A$ and $S_B$ at the beginning of frame 2 makes $S_A$-old = 1 and $S_B$-old = 0 at the beginning of frame 3. Referring to truth Table A, the beginning of frame 3 corresponds to line 3 of the truth Table A which shows under this situation that the data from memory A1 goes to the voice port again and any data from the receiver goes into memory B1. During frame number 3 if the system receives data from the receiver, it loads it into memory B1, status bit $S_B$ does to a 1, indicating a data reception. Later on in frame 3 data is sent to the port from memory B1. Thus, the system is sending the same data that was in frame 2 to the port in frame 3 to cover the freeze-out which occurred in frame 2. Thus, line B of FIG. 11 represents line 3 of the truth Table A.

Line C of FIG. 11 depicts the system's operation at the end of a talkspurt when there is no more data for the port. In line C, at frame 2, the system normally expects to receive data for memory B1. But with the end of a talk spurt in frame 2, there will be no data received in either frame 2 or frame 3. Thus, line C of FIG. 11 shows $S_B = 0$ in frame 2 and $S_B$ and $S_A$ equaling 0 in frame 3. As is seen in truth Table A, line 5, this is interpreted as the end of the talkspurt and thus background noise will be sent to the port. No data is received in frame 3 and thus the system repeats the same data for memory A1 and sends it to the voice port. In frame 4 all status bits are 0, that is $S_A$, $S_B = 0$, $S_A$-old, $S_B$-old = 0. That corresponds to line 5 of the truth Table A which selects a voice port noise. Noise goes to the voice port at that time and for thereafter. At any time when new data is received for that port, when a new talkspurt occurs, an arbitrary choice is made which is indicated by line 5 of the truth Table A and that data is put into memory A1.

Lines D, E and F of FIG. 11 are very similar to lines A, B and C above, except the timing of the data reception from the receiver and the transmission of the port is reversed to become the mirror image, respectively, of lines A, B and C, starting with memory B1 instead of memory A.

The functional block diagram of the communications controller of FIG. 4 has the digital switch 22 connected to each voice port 26.1 through 26.M by means of a respective control line 100, a respective data line 110, and a receive frame marker pulse line 115. Associated with each voice port 26.1 through 26.M, for example voice port 26.1, are respective steering AND gates 112 and 114 having the data line 110 input thereto, the output of AND gate 112 connecting the data line 110 to the data input of memory A (24.1) and the output of the AND gate 114 connecting the data line 110 to the data input of memory B (32.1). The control logic 34.1 associated with the voice port 26.1 is shown in FIG. 10. Identical control logic to that of FIG. 10 is associated with each of the other voice ports 26.2 through 26.M.

FIG. 4 shows the two status bits associated with the memories A1 and B1, being stored in status bit memories 28.1 and 30.1. These two status bit memories appear in the detailed FIG. 10 and are labeled status bit memory A and status bit memory B. Connected to those two status bits is the control 34.1 of FIG. 4 and in that control are stored the status bits $S_A$ and $S_B$, $S_A$-old and $S_B$-old that appear in truth Table A.

As indicated in the timing diagram of FIG. 11, the status of these bits is examined only at the beginning of each frame. The marker pulse for the beginning of the receive frame is input on line 115 in FIG. 10. At the beginning of a receive frame the system updates clock status bits $S_A$, $S_B$, $S_A$-old and $S_B$-old, and at that time status bit $S_A$-old takes the previous value $S_A$, status bit $S_B$-old takes the previous value $S_B$, status bit $S_A$ takes the value of status memory bit A which is connected to it as shown in FIG. 10, and likewise for status bit $S_B$. The FIG. 10 designations $S_A$, $S_B$, $S_A$-old and $S_B$-old are the same terms that appear in truth Table A. Equations 1, 2a and 2b are implemented from the output states of the four status bit flip-flops $S_A$, $S_B$, $S_A$-old and $S_B$-old in FIG. 10. Line 101 of FIG. 10 gates the data in the memory A1 in the logical operation that corresponds to Equation 2a. The logic blocks creating the output of line 101 represent Equation 2a. For example, 101 is fed from an OR block and that OR block has an AND on the left-hand side of FIG. 10 and the two inputs to the AND gate are $S_A$ and $\bar{S}_B$ which is the first term of Equation 2a. The other input to that OR gate having output line 101 is another AND gate whose two inputs are connected to two more AND gates, and those two AND gates have the input terms $\bar{S}_A$, $\bar{S}_B$, $S_A$-old and $S_B$-old, the same binary variables that appear in Equation 2a for the second term. Thus, the AND and OR logic blocks connected as shown at the bottom part of control block 34.1 in FIG. 10 creates the command to memory A1 to send its data to the port. In a similar manner, other AND and OR logic blocks shown in FIG. 10 which are connected to output line 102 create the command on line 102 to send data in memory B1 to the port, in accordance with Equation 2b. And in a similar manner, other AND logic blocks shown in FIG. 10 which are connected to output line 103, create the command on line 103 to send the background noise to the port. The logic connected to line 103 corresponds to Equation 1. Load Equation 3a says that data is loaded from the receiver into memory A1 when either noise is selected to go to the voice port or the system has not selected memory A1 to go to the voice port. The term "noise" in Equation 3a is the value of Equation 1. Equation 3a corresponds to the logic blocks connected to line 104 of FIG. 10 which steer the data from the receiver to memory A1. In a similar manner that logic blocks connected to line 105 of FIG. 10 steer the data from the receiver to memory B1, in accordance with Equation 3b. It should be understood that the logic shown in FIG. 10 is duplicated for every port 26.1, 26.2, . . . 26.M shown in FIG. 4.

With respect to FIG. 4, from switch 22 there are two output lines to each port. One is the control line 100 and the other line is the data line 110. The data line conveys the actual data coming from the switch 22. The control line 100 is simply an indication that there is data to be received at that time for this voice port. Control line 100 goes to both status bits, the status bit 28.1 on memory A1 and the status bit 30.1 on memory B1. The control line 100 sets one of those two status bits valid according to which memory the data is to be put into. The data line 110 from the switch goes into two AND gates 112 and 114. Those two AND gates 112 and 114 steer the data into either memory A1 or memory B1. When the system steers data into the memory A1 the status bit 28.1 is set for A1 according to truth Table A. The lines that come out of the control box 34.1, i.e., lines 101, 102 and 103 are for sending data to the port. Line 101 controls sending the data from memory A1 to the voice port, line 102 controls sending the data from memory B1 to the voice port and line 103 controls sending noise to the voice port. They are the three outputs that are shown in FIG. 10 and the equations for them appear in truth Table A. The line 106 coming from the voice port 26.1 to the control 34.1 signals that the voice port 26.1 accepted the data. At the beginning of a frame the system decides what will be sent to the voice port, the data from memory A1, data from memory B1, or noise. Sometime during that frame the voice port accepts the data. When that occurs line 106 signals back to the control 34.1 that the data was taken. The signal on line 106 then causes the reset of the status bit memories 28.1 and 30.1, as can be seen in FIG. 10.

While the invention has been particularly shown and described with reference to the preferred embodiment thereof, it will be understood by those skilled in the art that the foregoing and other changes in form and detail may be made therein without departing from the spirit and scope of the invention.

Having thus described our invention, what we claim as new, and desire to secure by Letters Patent is:

1. In a TDMA communication system having at least one transmission station where voice signals are digitized and transmitted over a communication link to a receiver having M voice ports, in no more than M time division multiplexed channels per frame period, apparatus for reducing the effects of voice channel freeze-out, comprising:

- a first memory in said receiver having M storage locations each connected to said link for storing a respective one of said channels in the last received frame, each location having an input status bit to indicate whether the last access to the respective location was a write-in or a read-out operation, each respective location having an output switchably connected to a corresponding one of said M voice ports;
- a second memory in said receiver having M storage locations each connected to said link for storing a respective one of said channels in the presently received frame, each location having an input status bit to indicate whether the last access to the respective location was a write-in or a read-out operation, each respective location having an output switchably connected to a corresponding one of said M voice ports;
- a background noise generator in said receiver having an output switchably connected to each of said M voice ports;
- control means in said receiver having an input connected to each of said input status bits in said first and second memories, having a first plurality of control outputs each connected to a respective one of said locations in said first memory for switchably connecting the output of each of said locations in said first memory to said corresponding voice port in response to the input status bit for the corresponding location in said second memory indicating that the respective channel in said present frame has not been stored, said control means including a second plurality of control outputs each connected to a respective one of said second memory locations, for switchably connecting the output of said background noise generator to said corresponding voice port in response to the input status bit for the corresponding location in said first and second memories indicating that the respective channel in said last frame and the respective channel in said present frame have not been stored;

whereby said corresponding voice port receives the corresponding last channel received when the corresponding present channel has not been received over said link, and receives a background noise signal when said corresponding channels from more than one consecutive frame are not received over said link.

2. In a TDMA communication system having at least one transmission station where voice signals are digitized and transmitted over a communication link to a receiver having M voice ports, in no more than M time division multiplexed channels per frame period, apparatus connected between each port and said link for reducing the effects of voice channel freeze-out, comprising:

a first memory in said receiver connected to said link for storing a respective one of said channels in the last received frame, having a status bit to indicate whether the last access to the first memory was a write-in or a read-out operation, the first memory having an output switchably connected to a corresponding one of said M voice ports;

a second memory in said receiver connected to said link for storing a respective one of said channels in the presently received frame, having a status bit to indicate whether the last access to the second memory was a write-in or a read-out operation, the second memory having an output connected to a corresponding one of said M voice ports;

a background noise generator in said receiver having an output switchably connected to each of said M voice ports;

control means in said receiver having an input connected to each of said input status bits in said first and said second memories, having a first control output connected to said first memory for switchably connecting the output of said first memory to said corresponding voice port in response to the input status bit for said second memory indicating that the respective channel in said channel present frame has not been stored, said control means including a second control output connected to said second memory for switchably connecting the output of said background noise generator to said corresponding voice port in response to the status bit for the corresponding first and second memories indicating that the respective channel in said last frame and the respective channel in said present frame have not been stored;

whereby said corresponding voice port receives the corresponding last channel received when the corresponding present channel has not been received over said link, and receives a background noise signal when said corresponding channels from more than one consecutive frame are not received over said link.

3. In a TDMA communication system having at least one transmission station where voice signals are digitized and transmitted over a communication link to a receiver having a voice port, apparatus connected between the voice port and said link for reducing the effects of voice channel freeze-out, comprising:

a first memory in said receiver connected to said link for storing a respective one of said channels in the last received frame, having an output switchably connected to said voice port;

a second memory in said receiver connected to said link for storing a respective one of said channels in the presently received frame, having an output switchably connected to said voice port;

control means in said receiver having an input connected to said first and said second memories, having a first control output connected to said first memory for switchably connecting the output of said first memory to said voice port in response to said second memory failing to store the respective channel in said present frame;

whereby said voice port receives the corresponding last channel received when the corresponding present channel has not been received over said link.

4. The apparatus of claim 3 which further comprises:

said control means including a second control output connected to said second memory for switchably interrupting the further transmission of data to said voice port in response to neither said first nor said second memories storing a channel in either said last frame or said present frame;

whereby the end of a talkspurt is distinguished from a freeze-out event.

* * * * *